United States Patent [19]
Oxford

[11] Patent Number: 5,149,118
[45] Date of Patent: Sep. 22, 1992

[54] ALL-TERRAIN WHEELCHAIR

[76] Inventor: Stuart G. Oxford, 13616 N. 78th St., Omaha, Nebr. 68122

[21] Appl. No.: 594,343

[22] Filed: Oct. 9, 1990

Related U.S. Application Data

[63] Continuation-in-part of Ser. No. 439,612, Nov. 20, 1989, which is a continuation-in-part of Ser. No. 263,417, Oct. 27, 1988.

[51] Int. Cl.$^5$ .................. B63B 35/02; B63H 16/00
[52] U.S. Cl. .................. 280/250.1; 114/270; 280/304.1; 297/445; 440/21; 440/32; 440/90; 440/100; D12/316; D21/237
[58] Field of Search ............. 280/304.1; 440/21, 26, 440/32, 90, 98, 100; 297/DIG. 4, 284 R; D6/334, 335; D12/316; D21/237

[56] References Cited

U.S. PATENT DOCUMENTS

| | | | |
|---|---|---|---|
| 244,084 | 7/1881 | Steinly | 105/129 |
| 441,409 | 11/1890 | Hardy | 280/217 |
| 579,664 | 3/1897 | McConley | 280/272 |
| 654,986 | 7/1900 | Krueger | 280/250.1 |
| 790,853 | 5/1905 | Reddy | 105/129 |
| 913,625 | 2/1909 | David | 105/129 |
| 963,857 | 7/1910 | Broomhall | 254/323 |
| 1,237,175 | 8/1917 | Cook et al. | 114/270 |
| 1,270,104 | 6/1918 | Benton et al. | 180/7.5 |
| 1,722,516 | 7/1929 | Cook | 114/270 |
| 2,592,023 | 4/1952 | Gleason | 180/9.23 |
| 2,979,016 | 4/1961 | Rossi | 114/270 |
| 3,042,131 | 7/1962 | Dovci | 280/250 |
| 3,045,636 | 7/1962 | Thomas et al. | 440/26 |
| 3,301,574 | 1/1967 | Good | 280/211 |
| 3,309,110 | 3/1967 | Bulmer | 280/250.1 |
| 3,877,725 | 4/1975 | Barrola | 280/250.1 |
| 3,994,509 | 11/1976 | Schaeffer | 280/250.1 |
| 4,138,131 | 2/1979 | Sommer | 280/220 |
| 4,354,691 | 10/1982 | Saunders et al. | 280/250.1 |
| 4,494,937 | 1/1985 | Riermann | 114/270 |
| 4,545,593 | 10/1985 | Farnam | 280/250.1 |
| 4,558,878 | 12/1985 | Motrenec | 280/272 |
| 4,641,847 | 2/1987 | Busse | 280/250.1 |
| 4,682,784 | 7/1987 | Anderson | 280/250.1 |
| 4,732,402 | 3/1988 | Lambert | 280/250.1 |
| 4,744,324 | 5/1988 | Martinmaas | 114/770 |
| 4,754,825 | 7/1988 | Scheffer | 180/7.5 |
| 4,926,777 | 5/1990 | Davis, Jr. | 280/250.1 |

FOREIGN PATENT DOCUMENTS

| 144270 | 6/1985 | European Pat. Off. | 114/270 |
|---|---|---|---|
| 3814818 | 10/1989 | Fed. Rep. of Germany. | |
| 863541 | 4/1941 | France. | |
| 23071 | 12/1906 | United Kingdom. | |

OTHER PUBLICATIONS

Don Kreb's "Access to Recreation" pp. 8 & 16.

Primary Examiner—Mitchell J. Hill
Attorney, Agent, or Firm—Zarley, McKee, Thomte Voorhees & Sease

[57] ABSTRACT

An all-terrain wheelchair comprising a frame constructed of tubular air-filled frame members to enable the wheelchair to be amphibious. A pair of rear drive wheels are rotatably mounted on the rear of the frame and are controlled by ratchet arms operatively connected thereto. A front wheel is rotatably mounted on the frame at the forward end thereof. If additional floatation is required, floatation tanks may be secured to the frame. A paddle wheel is operatively secured to each of the rear wheels when the wheelchair is being used in the water to provide propulsion.

3 Claims, 4 Drawing Sheets

ALL-TERRAIN WHEELCHAIR

CROSS REFERENCE TO RELATED APPLICATION

This is a continuation-in-part application of the application entitled "ALL-TERRAIN WHEELCHAIR" filed on Nov. 20, 1989, under Ser. No. 07/439,612 which issued as U.S. Pat. No. 5,020,818 which was a continuation-in-part application of the application entitled 'ALL-TERRAIN WHEELCHAIR" filed on Oct. 27, 1988, under Ser. No. 07/263,417 which issued as U.S. Pat. No. 4,892,323.

TECHNICAL FIELD

This invention relates generally to wheelchairs and more specifically to a wheelchair which may be utilized on all types of terrain.

BACKGROUND OF THE INVENTION

The conventional wheelchair is comprised of two large diameter, ground engaging, narrow width, pneumatic rear wheels mounted on an axle positioned beneath the seat portion of the chair with smaller diameter, narrow width, pneumatic, ground engaging wheels positioned forwardly of the rear wheels. The front wheels are pivotally mounted to vertical stanchions and generally are not able to be locked in any particular angular position. The occupant of the wheelchair is seated in a conventional fashion such that the lower portion of the occupant's legs will be generally perpendicular to the ground.

The operator of the conventional type wheelchair, when using the wheelchair off-road, is faced with a number of problems. The greatest problem is the instability caused by a high center of gravity. The wheelchair may topple over backwards when negotiating steep grades. When laterally traversing a steep incline, the wheelchair may tip sideways. Furthermore, when traversing downwardly, the occupant risks sliding out of the chair and/or having the chair become unbalanced and having the chair pitch forward.

The conventional wheelchair faces additional difficulties when traversing uneven surfaces or negotiating obstructions in the path. One difficulty is in being unable to proceed any further when a wheel becomes stuck in a depression, such that when the occupant attempts to free himself, the chair may be upset. A similar problem, with the same consequences, occurs when attempting to traverse obstructions—rocks, logs or curbs —in the pathway.

A further problem with the conventional wheelchair is that the user is unable to generate enough sustained human power to climb steep grades. If electric power is used, the battery and transmission make the wheelchair heavy and unwielding. Thus, the conventional wheelchair has limited capability for traversing inclines.

Another type of wheelchair is the sport model. Unlike the conventional model, the occupant's knees are bent upward such that the feet rest nearly in the same plane as the buttocks. The sport model wheelchair typically has a slightly longer wheel base, a slightly lower center of gravity and the hind wheels are slightly wider apart than the regular wheelchair. Sport wheelchairs may or may not have two front pneumatic ground engaging tires which have a tread width wider than the average rear pneumatic wheelchair tire. However, in the sport model, the outside diameter of the rear wheel is usually consistently as large as that of the regular wheelchair.

The sport wheelchair, however, faces problems similar to the conventional wheelchair when utilized off-road and in a steep incline situation. The sport model, while far more stable than the conventional wheelchair, still suffers problems in traversing a steep grade.

Both types of wheelchairs typically use narrow width pneumatic tires which are easily subject to puncture by branches, rocks and the like. When utilized in sandy, loose and unstable soil, the wheels sink and the occupant is stranded.

To lessen the puncture and traction problems several solutions have been propounded. One solution has been to mount an additional rear wheel to each side of the existing rear wheels, or to utilize a metal rear wheel. While the utilization of two adjacent wheels provides better traction, the puncture problem continues to exist and there are still some problems with sinking into soil. The metal wheel, while less likely to sink, lacks traction, and is incredibly uncomfortable for the user.

The wheelchairs of the co-pending applications represented a significant advance in the wheelchair art and solved many of the problems associated with the prior art wheelchairs. The only possible shortcoming to the wheelchairs of the co-pending applications is that it could only be used on land and could not be used on water. The wheelchair disclosed in the instant application is believed to be a significant improvement over the wheelchair described in the co-pending applications in that it may be used in the water and the wheels thereof may be interchanged for the particular type of terrain being traversed.

It is therefore a principal object of the invention to provide an improved all-terrain wheelchair.

Another object of the present invention is to provide a wheelchair which may be utilized on all types of terrain and may be used in water.

Another object of the present invention is to provide a wheelchair having a low center of gravity thereby increasing the stability thereof.

Still another object of the invention is to provide a wheelchair wherein the wheels thereof may be replaced for other types of wheels depending upon the particular terrain being traversed.

Still another object of the invention is to provide a wheelchair of the type described which includes a ratchet arm means at each side thereof for propelling the wheelchair.

Still another object of the invention is to provide an all-terrain wheelchair of the type described which is economical of manufacture, durable in use and refined in appearance.

These and other objects of the present invention will be apparent to those skilled in the art.

SUMMARY OF THE INVENTION

The all-terrain wheelchair of the present invention includes a frame having a forward end, a rearward end, and opposite sides with a pair of rear drive wheels being rotatably mounted on the frame at the rearward end thereof. A front wheel is rotatably mounted on the frame at the forward thereof. A seat is provided on the frame between the rear wheels for supporting a person thereon. The frame of the wheelchair is comprised of tubular, air-filled frame members which provides floatation for the wheelchair. If additional floatation is required, floatation devices may be secured to the frame. If the wheelchair is to be used in the water, a paddle wheel arrangement is operatively secured thereto to provide propelling motion to the wheelchair. The wheels of the wheelchair may be replaced by other types of wheels depending upon the particular terrain being traversed.

DESCRIPTION OF THE PREFERRED EMBODIMENT

Figure 1:
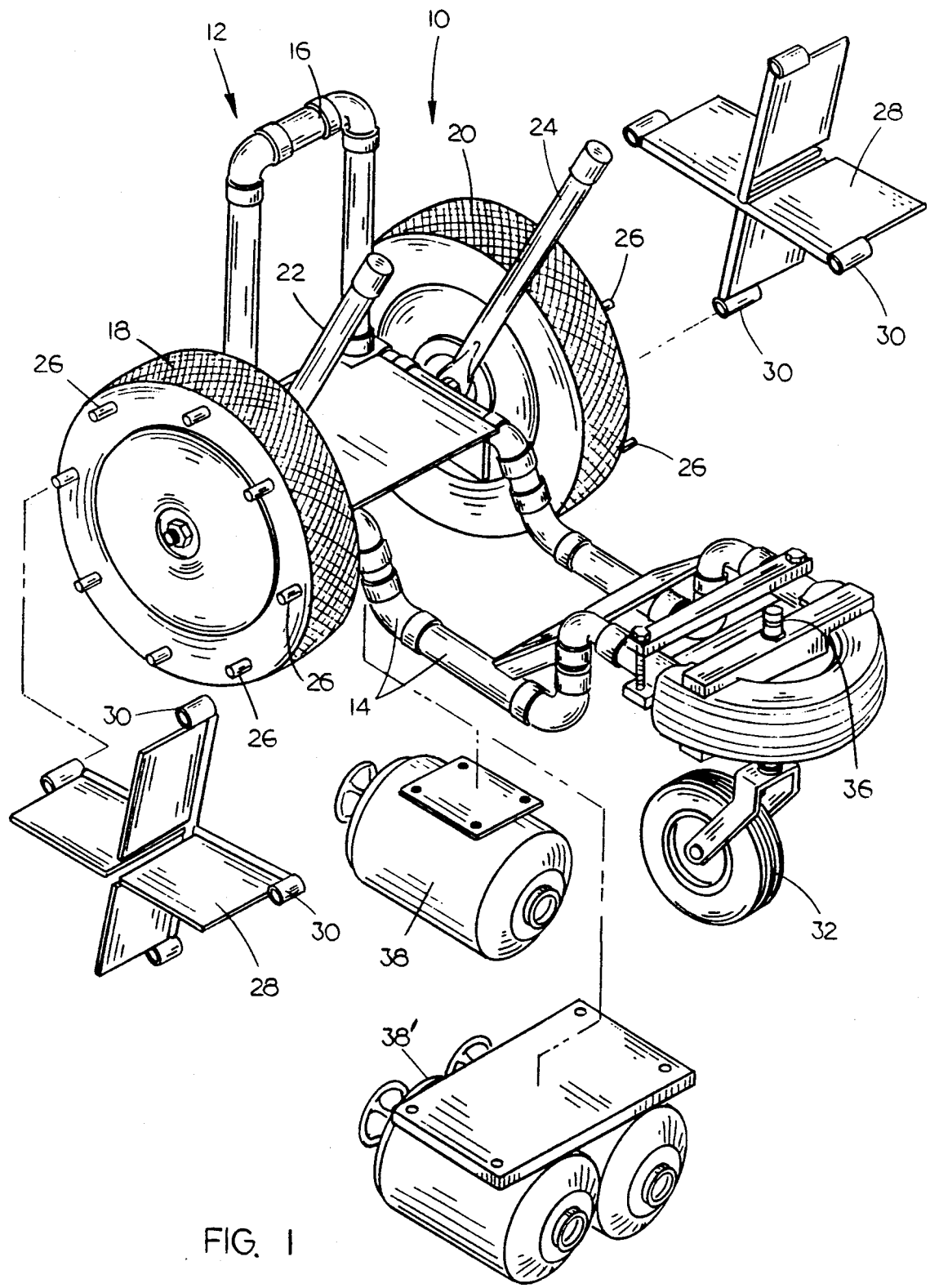
FIG. 1 is a perspective view of the all-terrain wheelchair illustrating the paddle wheel and air tanks.
Figure 2:
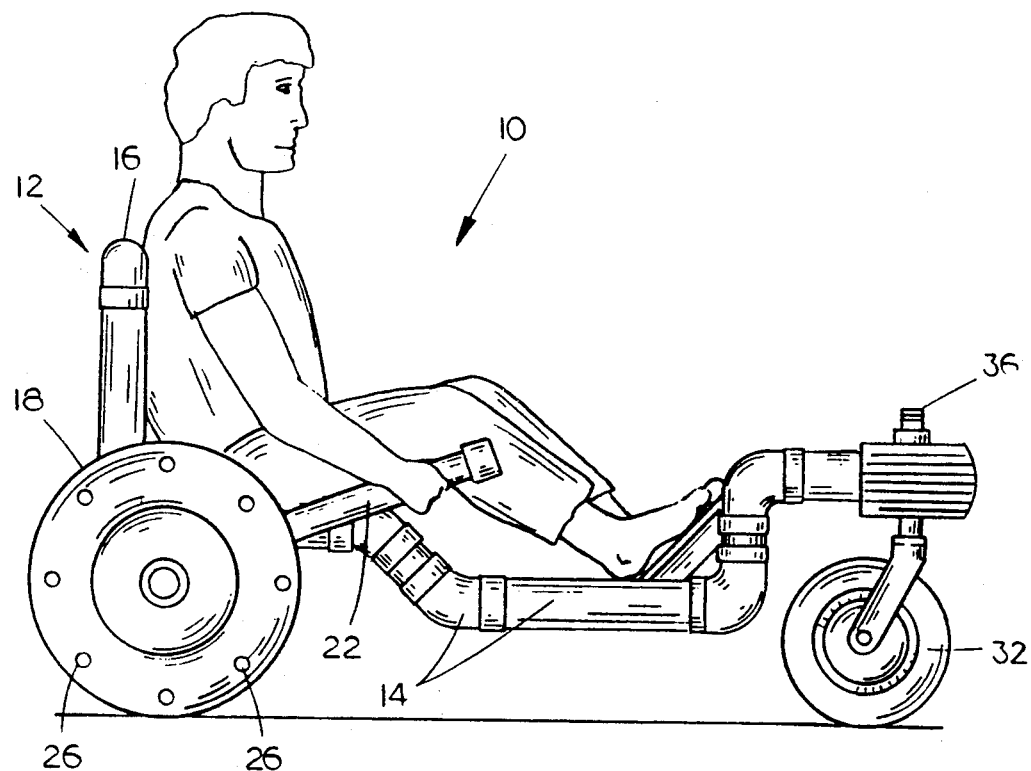
FIG. 2 is a side view of the wheelchair illustrating the wheelchair in use.
Figure 3:
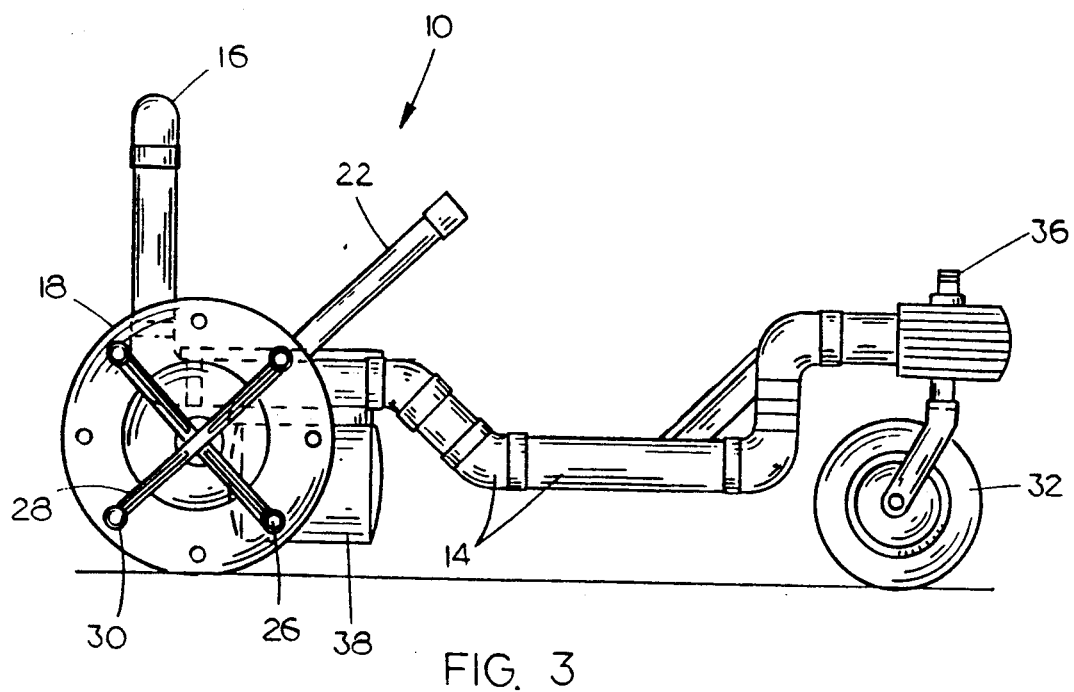
FIG. 3 is a view similar to FIG. 2 except a paddle wheel is attached to the tire.
Figure 4:
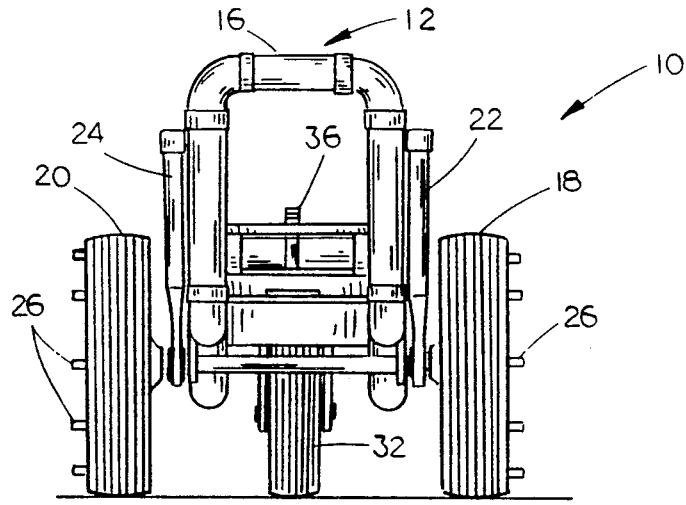
FIG. 4 is a rear view of the wheelchair with the ratchet arms in an upright position.
Figure 5:
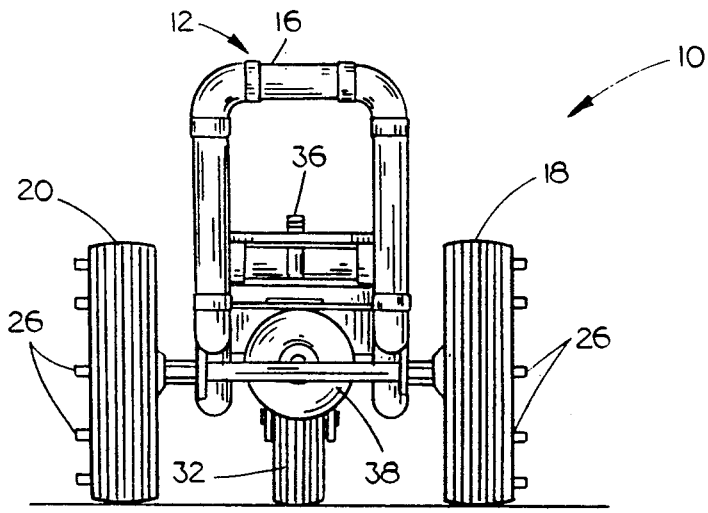
FIG. 5 is a view similar to FIG. 4 except an air tank has been added and the ratchet arms are down.
Figure 6:
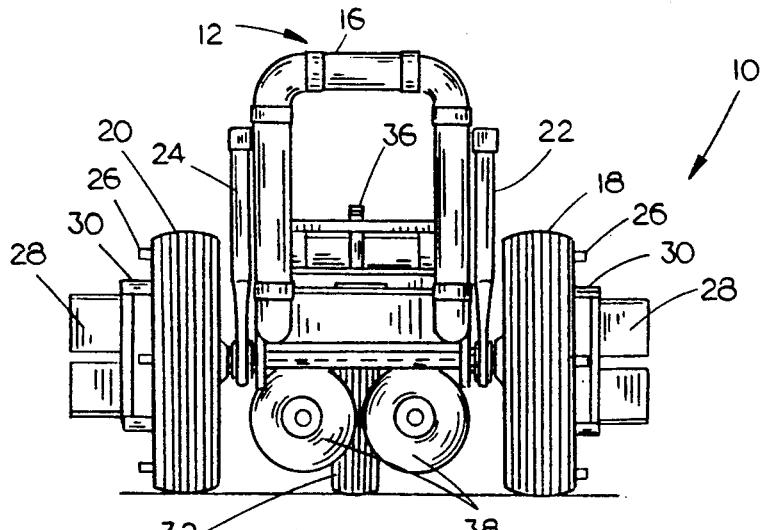
FIG. 6 is a view similar to FIGS 4 and 5 except two air tanks have been added and paddle wheels are attached to the wheels.

The all-terrain wheelchair of this invention is referred to generally by the reference numeral 10 and is designed so as to be able to traverse irregular terrain as well as being able to float in and move through a body of water. Wheelchair 10 includes frame means 12 which is comprised of hollow, sealed tubular plastic members which are air-filled so as to provide floatation to the wheelchair to enable the wheelchair to float in a body of water. Frame means 12 includes a bracket portion 16 which serves as an outboard motor bracket to permit an outboard motor to be attached to the wheelchair for propulsion purposes.

Wheelchair 10 includes a pair of pneumatic rear wheels 18 and 20 which are rotatably mounted at the rearward end thereof. Preferably, each of the wheels 18 and 20 are driven by means of a propulsion means generally referred to by the reference numbers 22 and 24 which are described in my U.S. Pat. No. 5,020,868 application, Ser. No. 439,612, filed Nov. 20, 1989, which is incorporated herein by reference.

Figure 7:
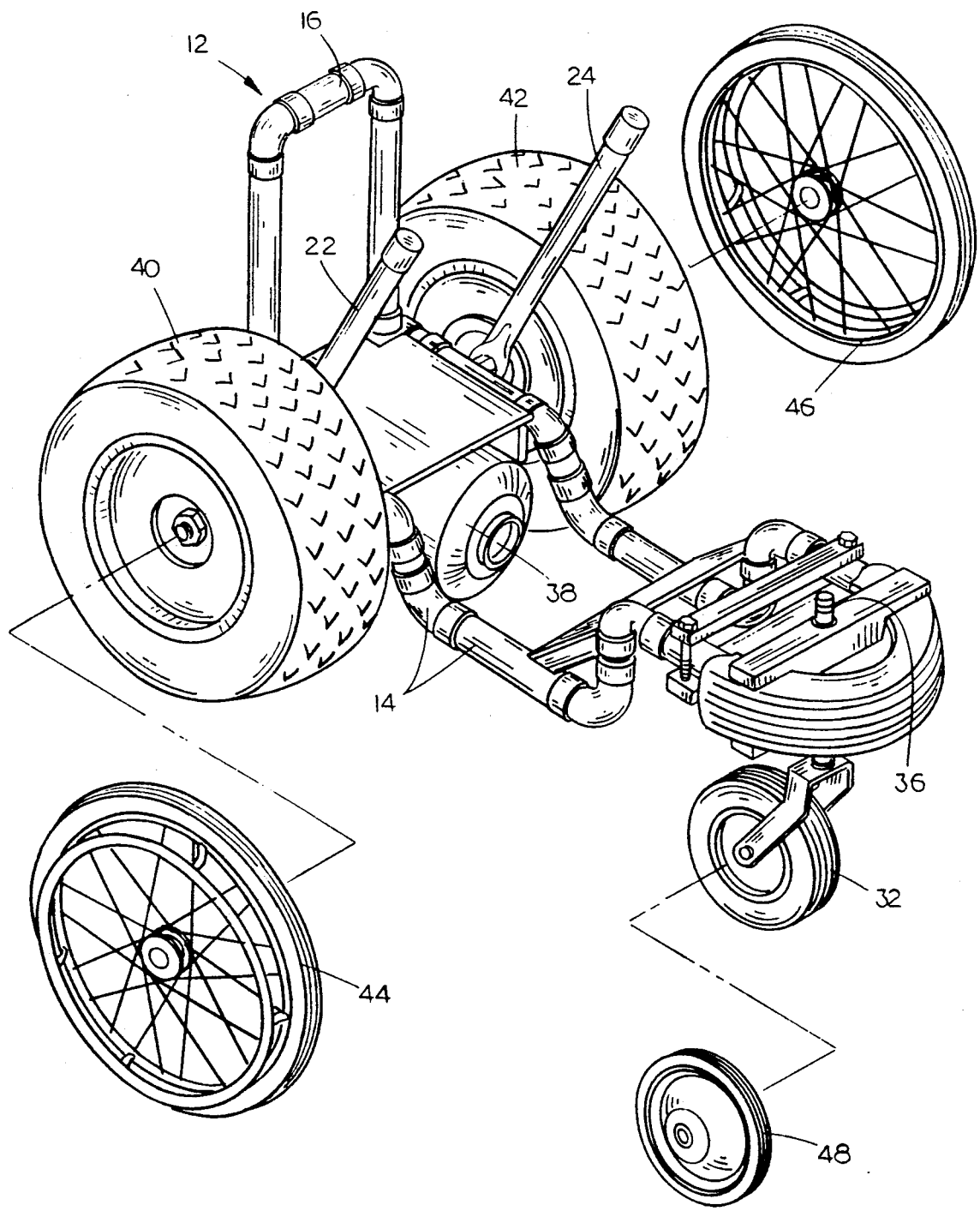
FIG. 7 is a perspective view showing substitute conventional wheelchair tires.

The rear wheels of the wheelchair may be of the type such as seen in FIG. 1 or of the type seen in FIG. 7. As seen in FIG. 1, wheels 18 and 20 are provided with a plurality of lugs 26 which extend horizontally outwardly therefrom. The lugs 26 may serve as gripping lugs if the operator of the wheelchair desires to propel the wheelchair in that fashion. The lugs 26 also serve to mount paddle wheels 28 thereon as seen in FIG. 1 so that propulsion is provided upon the rotation of wheels 18-20, in the water. As also seen in FIG. 1, the paddle wheels 28 include collars 30 which removably receive the lugs 26 therein. The paddle wheels 28 may be locked onto the wheels 18 and 20 by any suitable means.

At least one front wheel 32 is rotatably mounted on the forward end of frame means 12. The wheelchair may be steered by selective rotation of the wheels 18-20 in the same fashion as a conventional wheelchair.

If additional floatation is required, a plurality of air tanks or floatation devices 38 may be removably secured to the frame means by any convenient method.

If the wheelchair is being used in loose soil or sand, it is recommended that the larger, wide-track wheels 40 and 42 be utilized as depicted in FIG. 7. If the wheelchair is being used on hard surfaces, the smaller width wheelchair wheels 44 and 46 may be utilized. Further, a smaller width front wheel 48 may be utilized on hard surfaces if desired.

I claim:

1. In combination:
   a wheelchair of the type having an open frame with a forward end, rearward end, and opposite sides;
   said open frame comprising tubular, air-filled frame members to provide flotation for the wheelchair on water;
   a seat means mounted on the rearward end of said frame for supporting a person thereon;
   a pair of drive wheels rotatably mounted on the frame at the rearward end thereof and disposed opposite said seat means;
   a front wheel rotatably mounted on the forward end of the frame means;
   said front wheel rotatably mounted on a bracket which is pivotally mounted to said frame to freely pivot the wheel to rotate in the direction of travel of the wheelchair; and
   a floatation device removably mounted to said frame directly below said seat means, to provide buoyancy for the rearward end of the wheelchair in water.

2. The combination of claim 1, further comprising:
   each of said rear wheels having a plurality of spaced-apart, horizontally disposed lugs secured thereto which extend outwardly therefrom;
   a paddle wheel removably mounted on the lugs of each rear wheel;
   first propulsion means operatively connected to one rear wheel to selectively rotate the same; and
   second propulsion means operatively connected to the other rear wheel to selectively rotate the same independently of the first propulsion means.

3. The combination of claim 2, wherein each said rear wheel includes a hub portion and a tire portion, said lugs being secured to the tire portion of said wheels.

* * * * *